Sept. 29, 1953 H. WILKIE 2,654,084
BLIND LANDING AND APPROACH SYSTEM
Filed Oct. 10, 1945 3 Sheets-Sheet 1
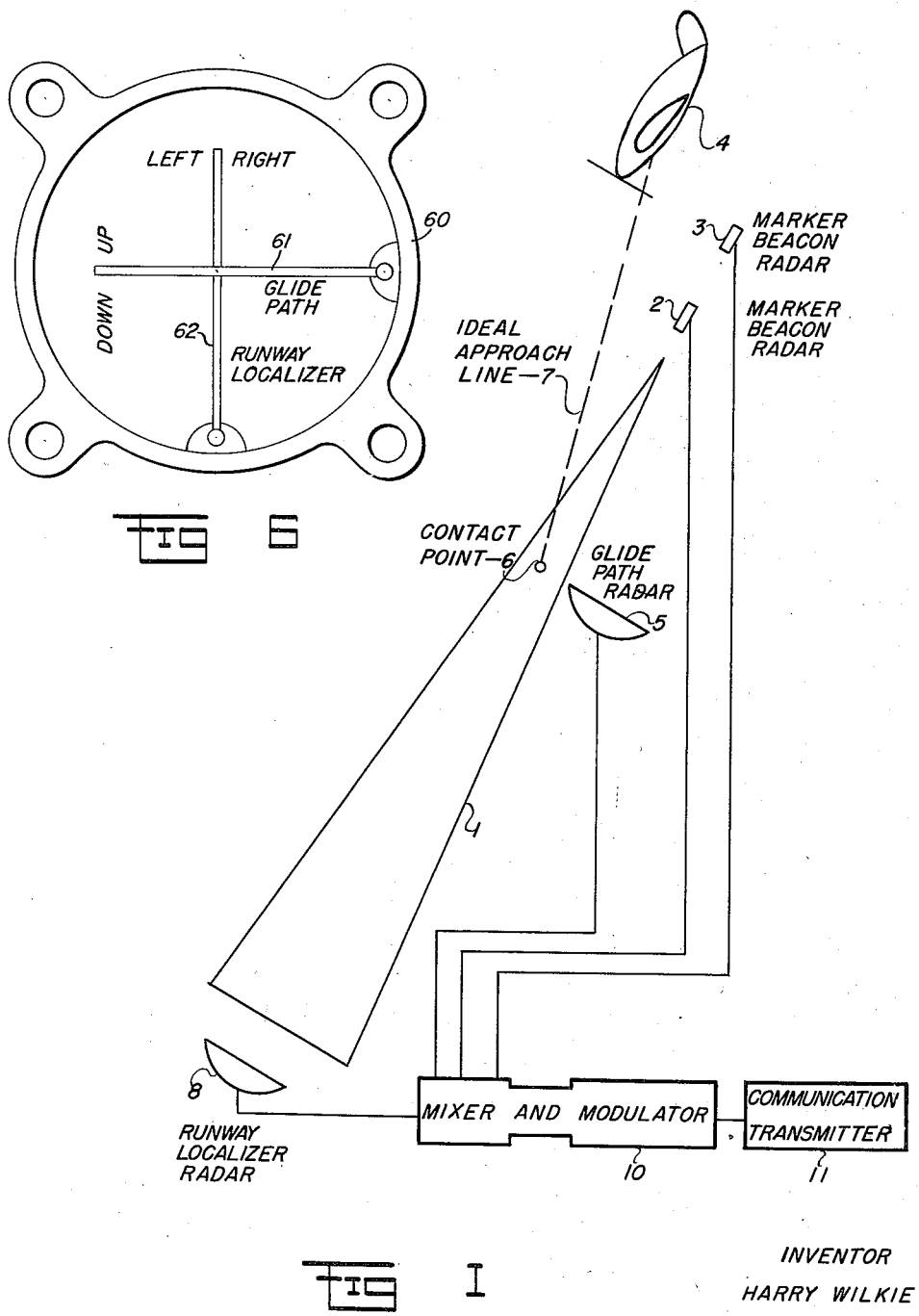
INVENTOR
HARRY WILKIE
ATTORNEY

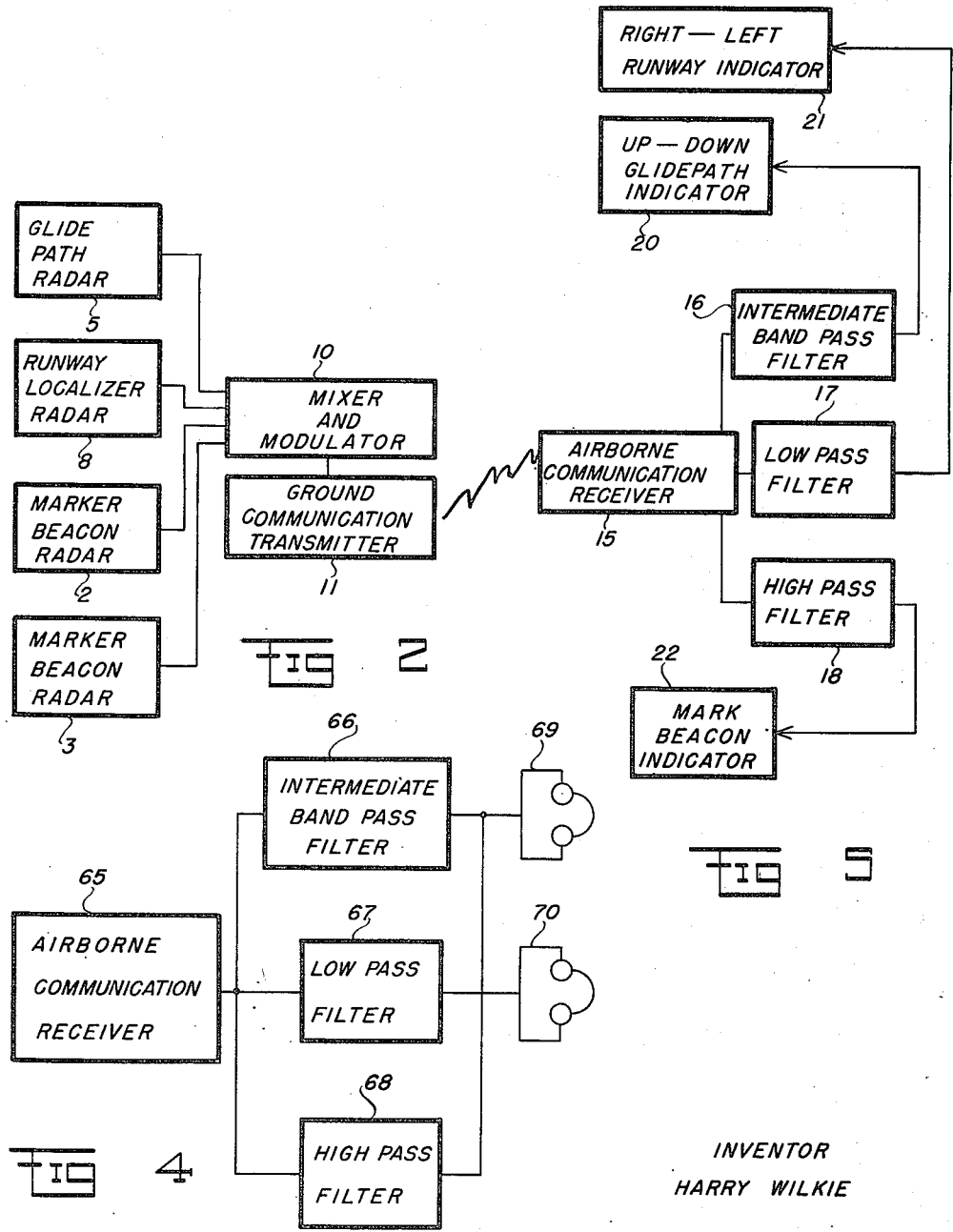

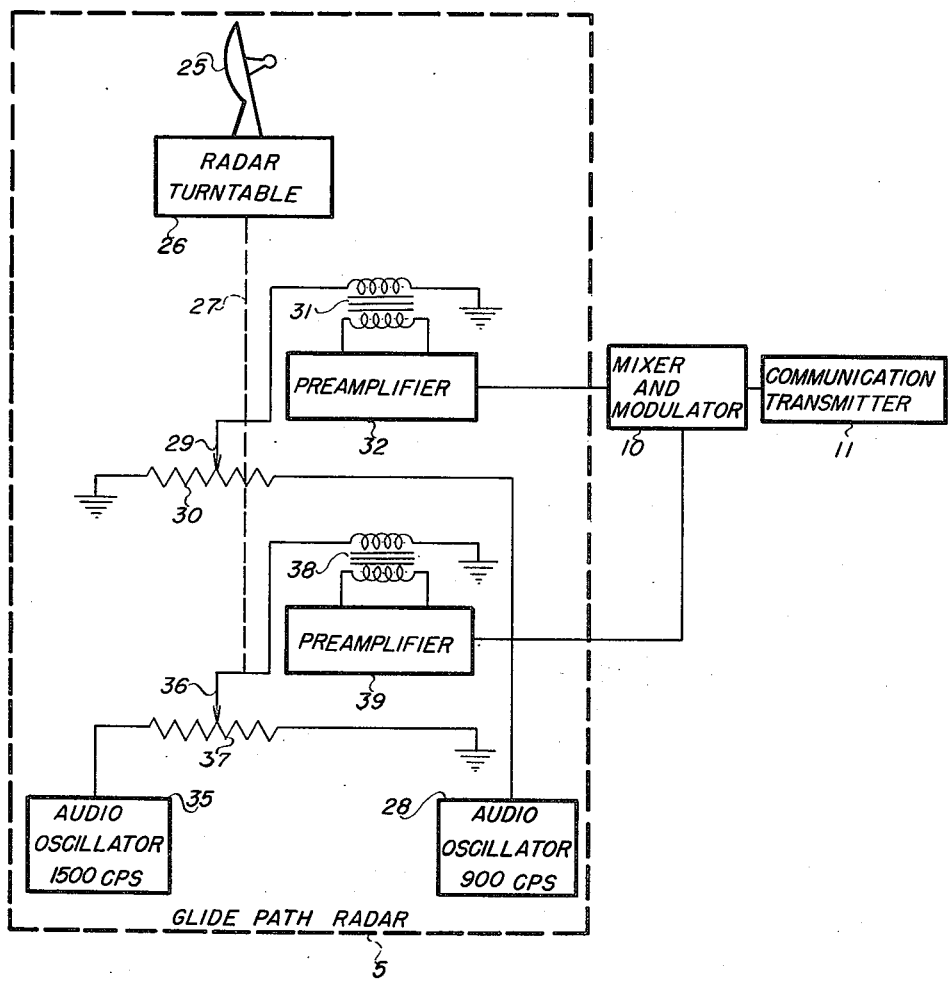

Patented Sept. 29, 1953

2,654,084

UNITED STATES PATENT OFFICE 2,654,084

BLIND LANDING AND APPROACH SYSTEM

Harry Wilkie, Dayton, Ohio

Application October 10, 1945, Serial No. 621,645

10 Claims. (Cl. 343—6)

(Granted under Title 35, U. S. Code (1952), sec. 266)

The invention described herein may be manufactured and used by or for the Government for governmental purposes, without the payment to me of any royalty thereon.

This invention relates to a radio system and more particularly to a navigation system for guiding the occupants of an airborne vehicle during its blind approach and landing at an airport under circumstances of low visibility, as through a dense fog, or the like.

In the past a number of separate receivers operating simultaneously and disposed within the pilot's compartment of an aeroplane have been used in blind approach and landing operations. The necessity of simultaneously maintaining communication with a number of ground stations for transmitting navigational information through a number of separate receivers of various forms has been difficult and, not infrequently, confusing.

The object of the present invention is to provide an improved radio blind approach and landing system that is simple and efficient in operation and that overcomes satisfactorily the more serious limitations in older comparable systems that have been used heretofore for the same or for similar purposes.

The above object is augmented by additional objects that will be apparent to those who are informed in the field of blind landing systems for aeroplanes from the following description of illustrative embodiments of the present invention that are shown in the accompanying drawings, wherein:

Fig. 1 is a perspective view of an aeroplane approaching a landing strip at an airport provided with directional indicators that are disposed, with respect to the landing strip, in conformity with the teachings of the present invention;

Fig. 2 is a block circuit diagram of the communication transmitter disposed at the airport shown in Fig. 1;

Fig. 3 is a schematic and block circuit diagram showing the details of the glide path radar that is a part of the radio system shown in Fig. 2;

Fig. 4 is a block diagram of an aural system that may be used for the usual system shown in Fig. 2 of the accompanying drawings and for use in maintaining communication between the aeroplane and the landing field shown in Fig. 1;

Fig. 5 is a block circuit diagram of a visual indicating system for disposition within an approaching aeroplane and for intercepting signals emitted from the transmitter that is shown in Fig. 2 for maintaining communication between the aeroplane and the landing field that is shown in Fig. 1; and Fig. 6 is a plan view of a cross pointer indicator part of the present invention and that is disposed upon the instrument panel of the approaching aeroplane.

An illustrative arrangement of landing facilities at an airport is shown in Fig. 1 of the accompanying drawings. In the arrangement there shown a landing strip 1 preferably has in alignment therewith and successively spaced preferably a few miles from the approach end thereof, a desired plurality of marker beacon radars 2, 3 etc. The marker beacon radars 2, 3 etc. are separated a desired number of miles from each other. The marker beacon radars 2, 3 etc. operate indicating devices in an approaching aeroplane 4, as it passes over these ground disposed markers, and serve the purpose of directing the aeroplane 4 toward the airport where the landing strip 1 is located.

The marker beacon radars 2 and 3 are radar sets which have radiation patterns that are similar to the radiation patterns of conventional marker beacons. The marker beacon radars 2 and 3 are provided individually with usual radar receivers. The presence of echo in the marker beacon radars 2 and 3 received from a plane overhead serves to place an identifying audio tone on the lines that lead from the radars 2 and 3 to the mixer and modulator 10. This identifying tone is applied to the transmitter 11, is radiated and is picked up by receiver 65 in the aeroplane 4. The reception of this identifying tone by the pilot in the aeroplane 4 advises the pilot that he is flying over the particular radar 2 or 3 from which the identifying tone is radiated. The tone generator is within the audio part of the marker beacon radar from which it originates. The above procedure is repeated, and a corresponding marker signal is transmitted from transmitter 11, when the aeroplane is above the nearer marker beacon radar 2. The signals from the marker beacon radars 2 and 3 differ from each other and are of distinctive frequencies, such as 2,000 megacycles per second, or the like. Each beacon has its own code.

In the embodiment of the present invention that is illustrated in Fig. 1 of the drawings, a vertical direction indicating glide path radar 5 is positioned on the ground and in lateral alignment with any part of the landing strip 1 that is preselected as a preferred zone of initial contact by the aeroplane 4 with the landing strip 1, such as a contact point 6, for example. The contact point 6 may be taken as the ground terminus of an ideal approach line 7. The ideal approach line 7 preferably makes an angle of approximately 3 degress with the horizontal plane of the landing strip 1. During the approach of the aeroplane 4 toward the landing strip 1, the vertical direction indicating glide path radar 5 serves to inform the pilot of the aeroplane 4 of his approximate angular bearing in a vertical plane with respect to the landing strip 1.

An azimuthal direction indicating runway localizer radar 8 is disposed adjacent the end of the landing strip 1 that is remote from the approach end thereof and serves to inform the pilot of the aeroplane 4 of the disposition of his aeroplane 4 with respect to the lateral edges of the landing strip 1, so that the aeroplane 4 may be landed safely therebetween.

The pilot of the aeroplane 4 is directed in his approach toward the landing strip 1 in conformity with the present invention by either a visual or an aural indicator system that is mounted within the aeroplane 4. A preferred transmitter system that is applicable to either the visual or the aural system, is shown in block diagram form in Fig. 2 of the accompanying drawings. A receiver system of a preferred visual type is shown in block diagram form in Fig. 5. A receiver system of a preferred aural type is shown in block diagram form in Fig. 4.

The transmitter system that is shown in Fig. 2 of the drawings, consists of a plurality of components that are disposed at the airport and that preferably comprise the marker beacon radars 2 and 3, the glide path radar 5, and the runway localizer radar 8, all of which feed output to a mixer and modulator 10 that passes signal to a transmitter 11. The output from the transmitter 11 is transmitted for interception by suitable receiving equipment that is disposed within the areoplane 4.

A preferred detailed circuit diagram of the radar 5 of the transmitting system that is shown in Fig. 2, is shown in Fig. 3 of the accompanying drawings. This circuit includes a radar antenna 25 that is operated mechanically by a turntable 26. The antenna 25 spots and tracks the approaching aeroplane 4, in the usual manner. The antenna 25 includes a power shaft that is indicated by the dash line 27 and that turns with the dish of the antenna 25 in vertical inclination during its manual or automatic tracking of the approaching aeroplane 4.

Alternating current is supplied from an audio oscillator 28 that is oscillating at an illustrative ferquency of 900 cycles per second hereafter referred to as C. P. S. Current from the audio oscillator 28 is divided at the point of contact of a potentiometer tap 29 with its resistor 30, part of the current being applied to ground through the remainder of the potentiometer resistor 30 and the other part of the current being applied to ground through the primary winding of a transformer 31. The alternating current that is induced into the secondary winding of the transformer 31 is amplified in a preamplifier 32 from which it is passed to the mixer and modulator 10.

Alternating current is supplied in a similar manner from another audio oscillator 35 that is oscillating at an illustrative frequency of 1500 C. P. S., and the current is divided at the point of contact of a potentiometer tap 36, that is ganged with the other potentiometer tap 29 by the shaft 27 and that engages its potentiometer resistor 37, part of the current passing to ground through the remainder of the potentiometer resistor 37 and the other part of the current passing to ground through the primary winding of a transformer 38. Current that is induced into the secondary winding of the transformer 38 is applied to a preamplifier 39 from which it also is passed to the mixer and modulator 10.

The two illustrative current frequencies of 900 C. P. S. and 1500 C. P. S. are mixed and modulate a radio carrier in the mixer and modulator 10. The resultant modulated signal provides part of the radio frequency output of the transmitter 11.

The circuit details of the runway localizer radar 8 are substantially a duplication of the circuit details of the glide path radar 5. As applied to the runway localizer radar 8, however, the antenna dish 25 rotates in azimuth around an axially disposed shaft that is represented by the dash line 27. Two generators, not shown, in the runway localizer 8 generate two signals that differ in frequency from those generated in the glide path radar 5, such as at frequencies of 90 and 150 cycles per second, or the like. The operation of the two frequencies that are associated with the runway localizer 8 are substantially a duplication of the operation of the two frequencies that are associated with the glide path radar 5 in that they also are applied by the mixer and modulator 10 upon the carrier radiated from the transmitter 11.

Six different signals are received by the mixer and modulator 10, one from each of the marker beacon radars 2 and 3, and two from each of the glide path radar 5 and from the runway localizer radar 8. The signals from the marker beacon radars 2 and 3 may be of the same frequency if desired. The signals from the glide path radar 5 and from the runway localizer radar 8 are of different frequencies from each other and from the signals from the marker beacon radars 2 and 3.

The outputs from both radars 5 and 8 are passed through the mixer 10 and to the transmitter 11 in which the frequencies that are superimposed upon the carrier wave are emitted as modulation by the transmitter 11. The modulation signal comprises proportional amplitudes of a plurality of audio frequencies for presentation within the approaching aeroplane 4 upon a preferred type of conversion means, either visual or aural.

Operatively, let it be assumed that as the areoplane 4 is approaching the air field at which the equipment that is disclosed herein is located, and passes substantially over the more remote marker beacon radar 3. This intelligence is conducted in the manner described through the mixer and modulator 10 to the communication transmitter 11 and a resultant signal from the transmitter 11 is intercepted by receiver 65 or 15 in the areoplane 4, informing a pilot in the plane 4 that he is above the marker beacon radar 3.

As the areoplane 4 continues to approach the landing strip 1, proportion signals indicating its proximity to the ideal approach line 7 are transmitted by the transmitter 11 under the control of the glide path radar 5 and of the runway localizer radar 8.

The aeroplane 4 is tracked continuously during its approach in elevation by the antenna 25 of the glide path radar 5 and in azimuth by the antenna for the runway localizer radar 8.

Changes in the vertical declination of the dish of the antenna 25 of the glide path radar 5, as the approaching aeroplane 4 is tracked, are conducted by the power shaft 27 to both of the ganged potentiometer taps 29 and 36. As the potentiometer tap 29 is moved by operation of the shaft 27 toward the grounded end of its potentiometer resistor 30, a decreasing proportion of the output of the oscillator 28 is introduced into the primary winding of the transformer 31 and 900 C. P. S. signal of decreased power is induced into the secondary winding of the transformer 31 and hence arrives for transmission at the transmitter 11. When the tracking movement of the antenna 25 moves the potentiometer tap 29 toward the grounded end of its resistor 30, it moves the potentiometer tap 36 on its potentiometer resistor 37 away from the grounded end and thereby increases the proportion of the 1500 C. P. S. output that is applied to the transformer 38 and that is passed for transmission to the transmitter 11. The signal that is transmitted from the transmitter 11, and that is received by the pilot in the approaching aeroplane 4, would then be predominantly of 1500 C. P. S. frequency and would indicate to the pilot that he is departing in inclination to that proportionate extent from the ideal approach line 7 and permit him to alter the rate of descent of his plane to more nearly approach the inclination of the ideal approach line 7.

As the approaching aeroplane 4 is being tracked, changes in the azimuth rotation of the dish of the antenna of the runway localizer radar 8 are conducted by a shaft that duplicates the power shaft 27 of the glide path radar 5, to both of a pair of ganged potentiometer taps that duplicate the ganged potentiometer taps 29 and 36 of the glide path radar 5. The remaining parts of the circuit of the runway localizer radar 8 correspond to those of the glide path radar 5 and function correspondingly to provide signals of a proportion of the corresponding C. P. S. values.

The signal frequencies that are transmitted from the transmitter 11 and that are received by the pilot in the approaching aeroplane 4, are predominantly of 150 C. P. S. frequency, for example. This signal indicates to the pilot of the aeroplane 4 that the aeroplane is departing to a corresponding proportional amount in azimuth from the ideal approach line 7. The pilot can then alter the flight course of the aeroplane 4 in azimuth to more nearly approach the azimuth direction of the ideal approach line 7, as explained hereinafter.

An aural receiver system is shown in Fig. 4 of the drawings and may be used in the approaching aeroplane 4 where a suitable known system of modulation is applied to the transmitter 11.

The aural receiver system that is shown in Fig. 4 comprises an airborne communication receiver 65 that passes its output to a desired plurality of band pass filters, such as an intermediate band pass filter 66, a low pass filter 67, and a high pass filter 68, or the like. The majority of aeroplanes are piloted by both a pilot and a co-pilot and hence suitable aural presentation devices, such as two pairs of head phones 69 and 70, or the like, are provided in the aural adaptation of the present invention that is illustrated in Fig. 6 of the drawing, one pair of head phones to be worn by the pilot and the other pair of headphones to be worn by the co-pilot.

In the illustration shown, the pair of headphones 69 receive the combined signal output from the intermediate band pass filter 66, the high pass filter 68 and the pair of headphones 70 receive signal output from the low pass filter 67. Preferably the signal that is received through the headphones 69 and 70 are in the nature of code made up of dots and dashes. The signal tone in the headphones 69 preferably differs from the signal tones in the headphone 70. In the airborne receiver 65, signals from the marker beacon radars 2 and 3 are isolated in the high pass filter 68 and are passed to the headphones 69.

Elevational pairs of signals originating in the glide path radar 5 are isolated in intermediate band pass filter 66 and passed to headphone 69. Illustratively, the code letter A, transmitted as a dot and a dash from the transmitter 11, may be adapted for indicating that the approaching aeroplane 4 is below the ideal approach line 7, and the code letter N, transmitted as a dash and a dot, may be adapted for indicating that the approaching aeroplane 4 is above the ideal approach line 7. The code letters may be interlocked, that is, the dot of the code letter A transmitted intermediate the dash and dot of the code letter N and the dash of the code letter A transmitted immediately after the dot of the N. The proportional amplitude of the interlocked keyed signal, as used on aural radio ranges and the like, determines the predominance of one code letter over the other, and hence whether the aeroplane 4 is flying below or above the ideal approach line 7. Assuming that the pair of headphones 69 are being worn by the pilot and receive signals originating at the glide path radar 5 and passed in code by the intermediate band pass filter 66, then the pilot would control the elevators upon the approaching aeroplane 4 during the landing operation in response to the A and N code signals that are received by him.

Signals originating at the runway localizer radar 8 are, in a similar manner transmitted in code from the communication transmitter 11 as, for example, the code letter D, as a dash and two dots, may be taken as an indication that the approaching aeroplane 4 is to the left of the ideal approach line 7, and the code letter U, as two dots and a dash, may be taken as an indication that the approaching aeroplane 4 is to the right of the ideal approach line 7. These code signals are intercepted by the receiver 65 and are isolated by the low pass filter 67 and are passed to the other pair of headphones 70 that are being worn by the co-pilot in the aeroplane 4. The co-pilot will then be in control of the rudder of the aeroplane 4 and will control its lateral disposition with respect to the ideal approach line 7 in response to the code signals that are received by him.

The different pairs of code signals that are transmitted from the transmitter 11 in the aural system preferably are of different audio frequencies. The received code signals are isolated from interfering signals in any desired usual manner, as, for example, by audio filters or the like so that the pilot and the co-pilot are not confused by signals from the marker beacons 2 and 3 or by the signals that are being received by each other.

A visual receiver system is shown in Fig. 5 of the drawings and preferably comprises a receiver 15, the output from which is applied to a desired plurality of filters of preselected band widths, such as an intermediate pass filter 16, a low pass filter 17 and a high pass filter 18, or the like, that pass their outputs to preferred types of indicator instruments. Preferably individual visual presentations are made upon a glide path indicator 20, a runway localizer indicator 21, and a marker beacon indicator 22, from signals that have been intercepted by the receiver 15 and passed by the filters 16, 17 and 18, respectively.

The indicators 20–22, inclusive, are disposed upon the instrument panel within the aeroplane 4.

The indication from the radar 8 and the radar 5 may be combined in a single conventional cross pointer indicator shown in Fig. 6 having a normally horizontal needle to indicate vertical departure and a normally vertical needle to indicate horizontal departure from the ideal glide path.

The presentation of the separate signals from the glide path radar 5 and from the runway localizer radar 8 appear upon the instrument panel before the pilot of the aeroplane 4, and preferably upon a cross pointer indicator 60 that is shown in Fig. 6 of the drawings.

The cross pointer indicator 60 comprises a substantially circular dial portion upon which two movable needles 61 and 62 are disposed. One glide path needle 61 is responsive to signal from the glide path radar 5 and indicates the altitudinal disposition of the approaching aeroplane 4 with respect to the predetermined ideal approach line 7. The glide path needle 61 extends from its attached end, which is mounted upon a galvanometer movement in the usual manner, to an unattached end that is adapted for movement in response to received signal between terminal indications, such as, "Down" and "Up," as shown. When the altitude of the approaching aeroplane 4 conforms with that of the ideal approach line 7 for any given position of the aeroplane 4, the glide path needle 61 is disposed substantially laterally across the center of the dial of the instrument 60.

A runway localizer needle 62 of the instrument 60 is responsive to signal from the runway localizer radar 8 and indicates the lateral disposition of the approaching aeroplane 4 in azimuth with respect to the ideal approach line 7.

The attached end of the runway localizer needle 62 is mounted upon a galvanometer movement and its unattached end is adapted for lateral movement in response to received signal between terminal indications, such as "Left" and "Right," as shown. When the approaching aeroplane 4 is in vertical alignment with the ideal approach line 7 and hence is substantially midway between the lateral edges of the landing strip 1, the runway localizer needle 62 crosses substantially the center of the dial portion of the cross pointer indicator instrument 60 in an upwardly direction.

The position of the needles 61 and 62 of the instrument 60 indicate to the pilot of the approaching aeroplane 4 with a reasonable degree of accuracy the disposition of the aeroplane 4 with respect to the landing strip 1 and whether the flight course of the aeroplane 4 coincides with the ideal approach line 7 or not. If the flight course of the aeroplane 4 is not upon the ideal approach line 7 it can be altered sufficiently so that the glide path needle 61 and the runway localizer needle 62 cross each other substantially at the center of the dial of the cross pointer indicator instrument 60. The instrument needles 61 and 62 then indicate that the approaching aeroplane 4 is substantially on the ideal approach line 7.

The proportional amplitude of the characters in the interlocked keyed signal, as used to adapt Fig. 3 to the aural system, may be effected by conventional mechanical radio range keying of the outputs of the preamplifiers 32 and 39 of Fig. 3. The mechanical keyer would be located in the mixer modulator 10. A single audio frequency would be used.

It is to be understood that the assemblage, the circuits and the components therein, that have been presented herein have been submitted for the purposes of illustrating and describing illustrative embodiments of the present invention and that various changes, alterations, modifications and substitutions may be made therein without departing from the scope of the present invention as defined by the appended claims.

What I claim is:

1. A radio system for use in blind approach and landing of a pilot directed aeroplane at an airport provided with a runway, comprising a glide-path radio-echo detection system tracking the approaching aeroplane, means connected to said glide path radio-echo detection system for generating a first signal indicative of the vertical angular relationship between the line of sight from said glide path radio-echo detection system to said aeroplane and an ideal glide path terminating on said runway, a runway localizer radio-echo detection system for generating a second signal indicative of the horizontal angular relationship between the line of sight from said runway localizer radio-echo detection system to said aeroplane and said ideal glide path, means at said airport for transmitting said first and second signals and means located in said aeroplane for receiving said signals and presenting the intelligence contained therein whereby the pilot of said aeroplane is continuously informed of the position of said aeroplane with respect to said glide path.

2. A radio system for use in blind approach and landing of a pilot directed aeroplane at an airport provided with a runway, comprising a glide-path radio-echo detection system tracking the approaching aeroplane, means connected to said glide path radio-echo detection system for generating a first signal indicative of the vertical angular relationship between the line of sight from said glide path radio-echo detection system to said aeroplane and an ideal glide path terminating on said runway, a runway localizer radio-echo detection system for generating a second signal indicative of the horizontal angular relationship between the line of sight from said runway radio-echo detection system to said aeroplane and said ideal glide path, a marker beacon radio-echo detection system for generating a signal indicative of the approach of the aeroplane within a predetermined distance of the runway, a transmitter at said airport, means for modulating said transmitter with each of said signals, and means located in said aeroplane for receiving said signals and presenting the intelligence contained in said signals, whereby the pilot of said aeroplane is continuously informed of the position of said aeroplane with respect to the glide path.

3. A radio system for use in the blind approach and landing of a pilot directed aeroplane at an airport provided with a landing strip, comprising an elevation-determining radio-echo detection system at said airport, a runway localizer azimuth-determining radio-echo detection system at said airport, each of said radio-echo detection systems including means for producing a directed radio beam, means for directing said radio beams at the aeroplane, and means for generating a signal representing the displacement of each radio beam, in elevation and azimuth respectively, from a predetermined glide path terminating on said landing strip, said predetermined glide path being the intersection of said radio beams at the positions at which said signals have a zero value, a radio transmitter at said airport, means for modulating said transmitter with all of said signals, and means in the aeroplane for receiving and indicating said signals.

4. The system defined in claim 3 including a plurality of radio-echo detection systems located at different distances from the landing strip and each having means for generating a distinctive signal indicative of the approach of the aeroplane within a predetermined distance of the landing strip, means for impressing said distinctive signals on said modulating means, and said aeroplane receiving and indicating means including means for indicating said distinctive signals.

5. A radio blind approach and landing system for pilot directed aeroplanes approaching an airport provided with a landing strip, comprising a glide path radio-echo detection system located at the airport, said system including means for tracking the approaching aeroplane and determining its vertical disposition with respect to the airport landing strip and means for generating a signal representing said vertical disposition, a runway localizer radio-echo detection system located at the airport, said last-named system including means for tracking the approaching aeroplane and determining its azimuth disposition with respect to the airport landing strip and means for generating a signal representing said azimuth disposition, and communication means at the airport for transmitting said signals to the aeroplane.

6. A radio system for directing the pilot of an aeroplane attempting to approach a landing strip at an airport along an ideal approach line during periods of low visibility, comprising a glide path radio-echo detection system located at the airport, said system including adjustable beam antenna means for tracking the aeroplane in elevation and generating a signal representing the angle of elevation of said beam with respect to the ideal approach line, a runway localizer radio-echo detection system located at the airport, said last named system including adjustable beam antenna means for tracking the aeroplane in azimuth and generating a signal representing the azimuthal position of said last named antenna beam with respect to the ideal approach line, means at said airport for transmitting both said signals to the aeroplane, and means in the aeroplane for receiving the intelligence so transmitted.

7. The system defined in claim 1, wherein each of said signal generating means includes means for producing a pair of interlocking Morse code signals each modulated with a different tone, and each radio-echo detection system includes an antenna of adjustable directivity and means for controlling the relative amplitudes of the tones of one pair of interlocking signals in accordance with the adjustment of the directivity of said antenna along one angular coordinate, and a plurality of radio-echo detection systems located in substantial alignment with the runway and at different distances therefrom and having vertically directed fan-shaped radiation patterns, each of said last-named radio-echo detection systems including means for generating a distinctive audio signal in response to the detection of an approaching aeroplane, and means for feeding said audio signals to said transmitting means for transmission to the approaching aeroplane.

8. The system defined in claim 1, wherein each of said signal generating means includes means for producing a pair of interlocking Morse code signals each modulated with a different tone, and each radio-echo detection system includes an antenna of adjustable directivity and means for controlling the relative amplitudes of the tones of a pair of said interlocking signals in accordance with the adjustment of the directivity of said antenna along one angular coordinate.

9. The system defined in claim 1, wherein each of said signal generating means includes means for producing two different frequencies, and each radio-echo detection system includes an antenna of adjustable directivity and means for controlling the relative amplitudes of the said two frequencies in accordance with the adjustment of the directivity of the antenna along one angular coordinate.

10. The system defined in claim 1, including a plurality of radio-echo detection systems located in substantial alignment with the runway and at different distances therefrom and having vertically directed fan-shaped radiation patterns, each of said last-named radio-echo detection systems including means for generating a distinctive audio signal in response to the detection of the approaching aeroplane, and means for feeding said audio signals to said transmitting means for transmission to the approaching aeroplane.

HARRY WILKIE.

References Cited in the file of this patent

UNITED STATES PATENTS

| Number | Name | Date |
| --- | --- | --- |
| 2,027,530 | Hammond | Jan. 14, 1936 |
| 2,132,599 | Baumann | Oct. 11, 1938 |
| 2,133,285 | Dunmore | Oct. 18, 1938 |
| 2,272,997 | Alford | Feb. 10, 1942 |
| 2,298,476 | Goldsmith | Oct. 13, 1942 |
| 2,321,698 | Noldeams | June 15, 1943 |
| 2,372,620 | Williams | Mar. 27, 1945 |
| 2,415,566 | Rhea | Feb. 11, 1947 |
| 2,433,381 | Marchand | Dec. 30, 1947 |
| 2,436,846 | Williams | Mar. 2, 1948 |
| 2,480,123 | Deloraine | Aug. 30, 1949 |
| 2,513,282 | Busignies | July 4, 1950 |
| 2,528,202 | Wolff | Oct. 31, 1950 |
| 2,535,038 | Busingies | Dec. 26, 1950 |
| 2,547,945 | Jenks | Apr. 10, 1951 |

OTHER REFERENCES

Signal Corps Exhibit C "Principle of Operation of Device of May 1937 Demonstration."